United States Patent
Lackey et al.

(10) Patent No.: US 7,501,173 B2
(45) Date of Patent: Mar. 10, 2009

(54) MEDALLION

(75) Inventors: Robert W. Lackey, Hickory, NC (US);
Robert C. Beckmann, Vail, NC (US)

(73) Assignee: RWL Corporation, Hickory, NC (US)

( * ) Notice: Subject to any disclaimer, the term of this patent is extended or adjusted under 35 U.S.C. 154(b) by 350 days.

(21) Appl. No.: 11/509,343

(22) Filed: Aug. 24, 2006

(65) Prior Publication Data

US 2008/0050549 A1    Feb. 28, 2008

(51) Int. Cl.
*E04F 19/02*    (2006.01)
(52) U.S. Cl. ............... 428/66.5; 428/66.6; 428/66.7; 52/311.2; 52/312; 52/315; 52/316
(58) Field of Classification Search ............... 428/66.5, 428/66.6, 66.7; 52/311.2, 312, 315, 316
See application file for complete search history.

(56) References Cited

U.S. PATENT DOCUMENTS

| | | | |
|---|---|---|---|
| D340,998 S | 11/1993 | Goodman | D25/145 |
| 5,533,636 A | 7/1996 | Reiker | 220/3.8 |
| 5,698,287 A | 12/1997 | Neiman | 428/66.5 |
| 5,899,663 A | 5/1999 | Feder et al. | 416/5 |
| 5,939,671 A | 8/1999 | Gretz | 174/50 |
| 5,975,853 A | 11/1999 | Lackey | 416/244 R |
| 6,199,813 B1 | 3/2001 | Oliva | 248/343 |
| 6,474,846 B1 | 11/2002 | Kelmelis et al. | 362/365 |
| 6,520,739 B2 | 2/2003 | Tsuji | 416/5 |
| 6,667,109 B1 | 12/2003 | Julliard | 428/542.2 |

*Primary Examiner*—Alexander Thomas
(74) *Attorney, Agent, or Firm*—Joseph T. Guy; Nexsen Pruet, LLC

(57) ABSTRACT

A multiple component decorative medallion includes a decorative annular base plate adapted to receive decorative rings which are held in place by releasable detents. The base plate and the rings can be used individually as decorative medallions or selectively combined to produce a variety of ornamental images.

14 Claims, 5 Drawing Sheets

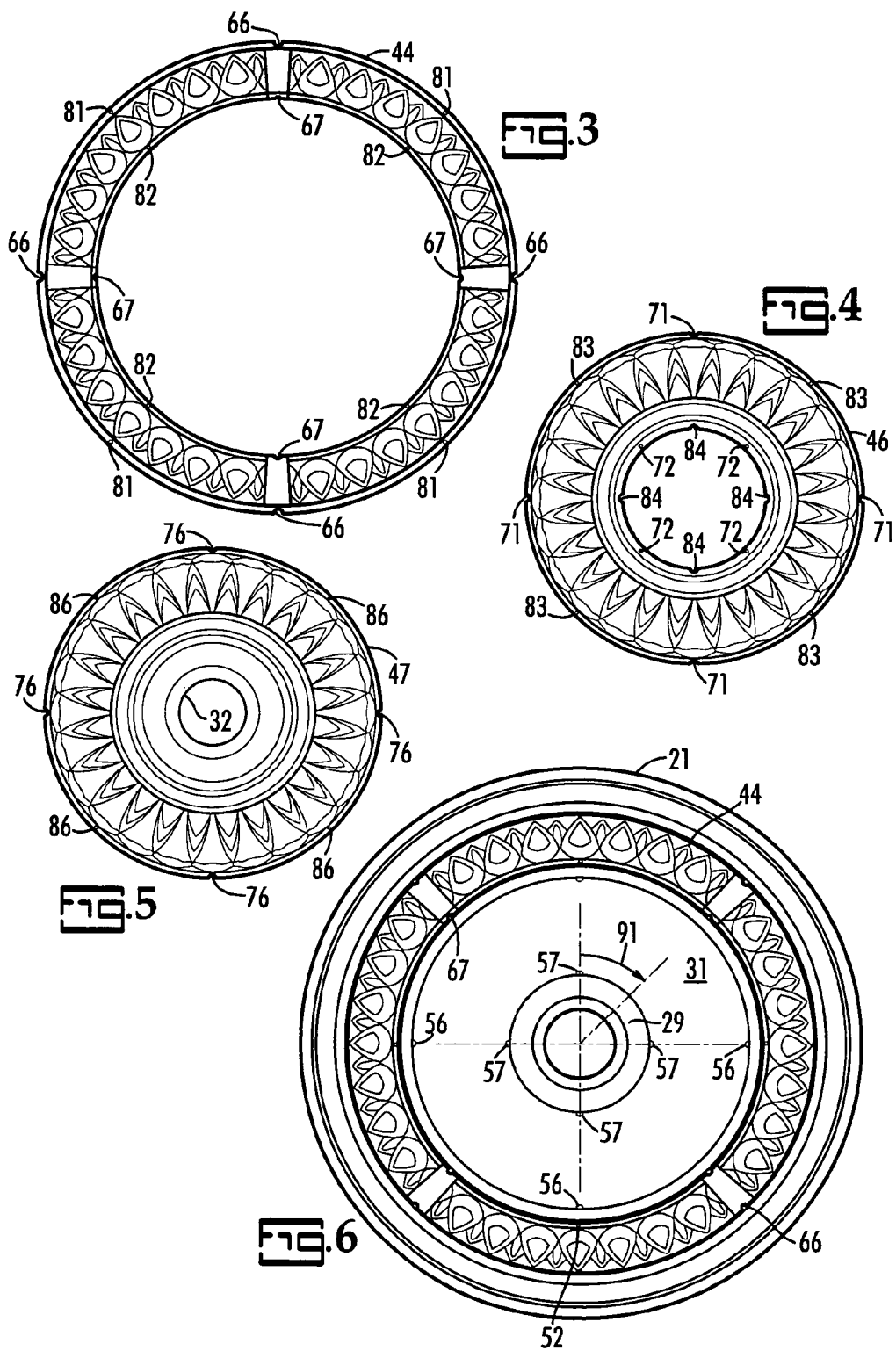

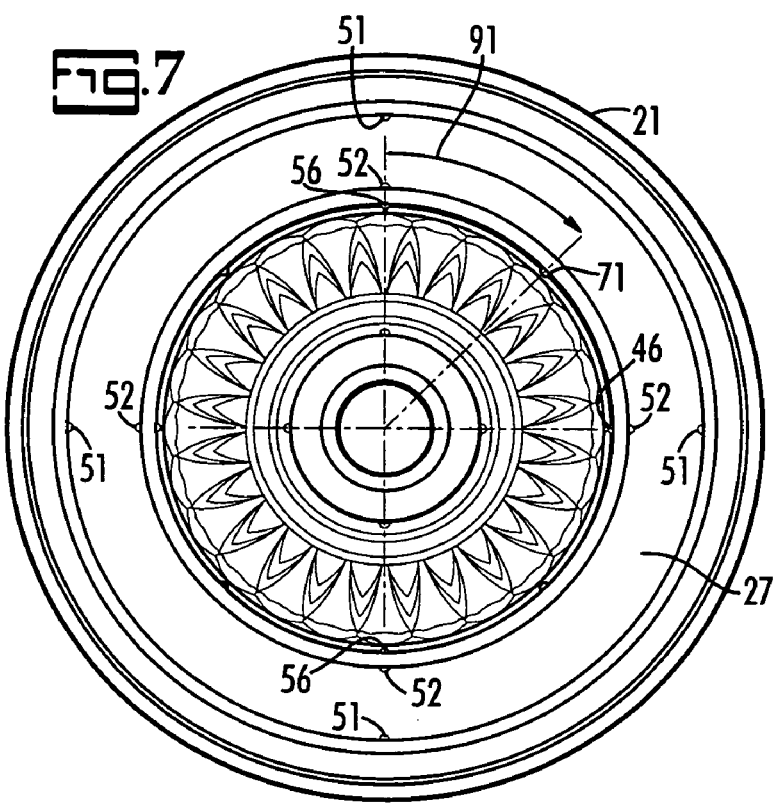
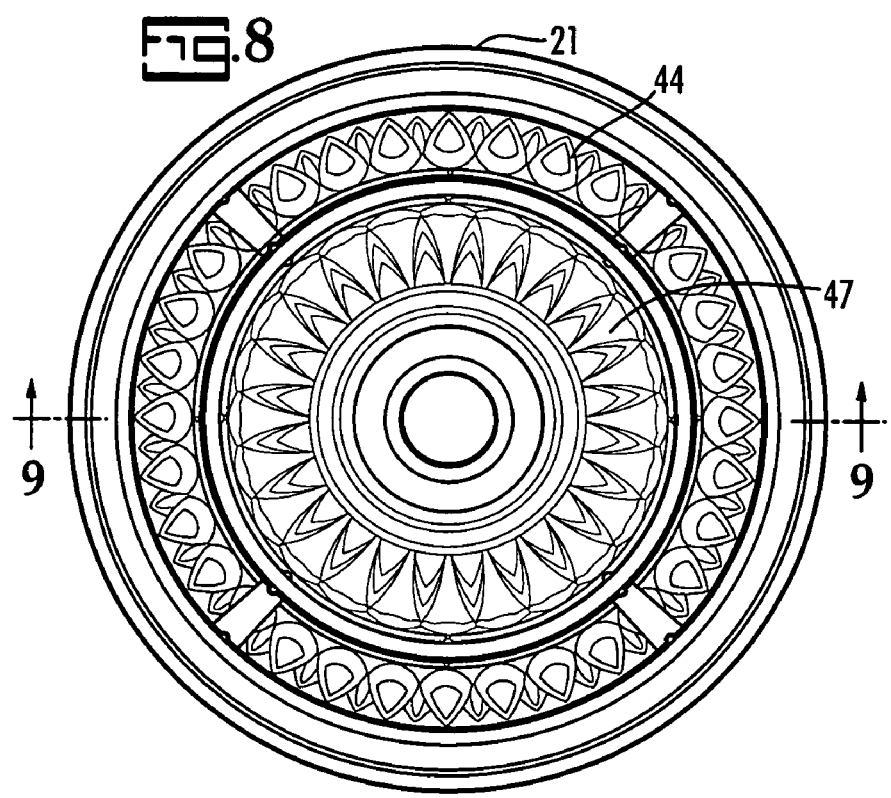

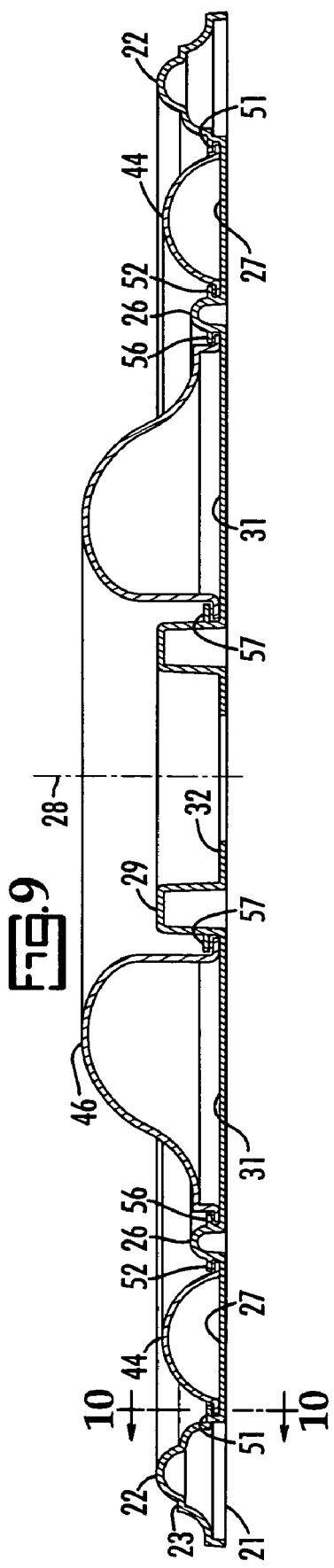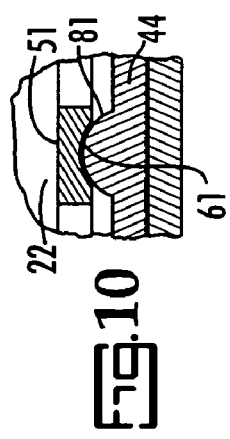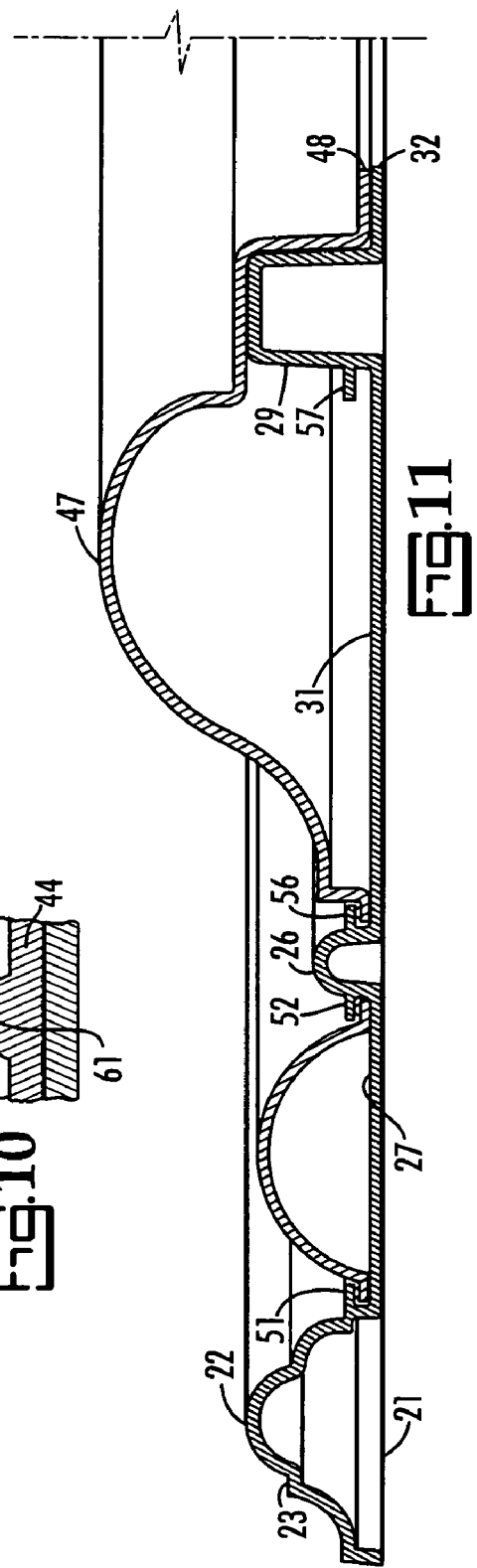

MEDALLION

RELATED APPLICATIONS

The herein disclosed subject matter is closely related to that of the inventor's co-pending U.S. patent application Ser. No. 11/509,342 filed Aug. 24, 2006 for a Method Of Merchandising Complementary Medallions which is incorporated herein by reference.

BACKGROUND OF THE INVENTION

Ceiling medallions in the form of decorative disks are used to accent or enhance the appearance of a ceiling fixture, such as a light fixture or ceiling fan. The medallions are decorative and a variety of surface ornamentations are used to provide the desired aesthetic effect. There are a great many variations in room decor and there are many differences in personal preferences concerning interior decoration thus giving rise to a need for a wide variety of ceiling medallions.

BRIEF DESCRIPTION OF THE INVENTION

A relatively large annular base plate or disk includes concentric annular recesses in which interchangeable decorative rings may be releasable mounted. The decorative effect of the medallion can be changed by choosing from several differently decorated rings and inserting the chosen ring in the mating annular recess. A base plate with two concentric annular recesses permits a variety of medallion designs to be produced by choice of inserted ring or rings. The chosen ring is inserted into the recess and rotated to bring mating detent components into registry or engagement in snap lock fashion, which releasably holds the ring in its associated recess.

BRIEF DESCRIPTION OF THE DRAWINGS

The construction of medallion base plates, insertable rings and plate plus ring combination are illustrated in the drawings, in which:

FIG. 3 is a front view of a large decorative ring;

FIG. 4 is a front view of a decorative ring that is smaller than the ring of FIG. 3;

FIG. 5 is a front view of a decorative ring which can be substituted for the decorative ring of FIG. 4;

FIG. 6 shows the ring of FIG. 3 inserted into a large annular recess in the base plate of FIG. 1;

FIG. 7 shows the ring of FIG. 4 inserted into an annular recess of the base plate of FIG. 1 which is concentric with but of smaller diameter than the large annular recess;

FIG. 8 shows rings of FIGS. 3 and 4 in the base plate of the medallion;

FIG. 9 is a section taken on line 9-9 in FIG. 8;

FIG. 10 is a section taken on line 10-10 in FIG. 9;

FIG. 11 is a partial section showing the rings of FIGS. 3 and 5 installed in the medallion base plate;

DETAILED DESCRIPTION OF THE INVENTION

Figure 1:
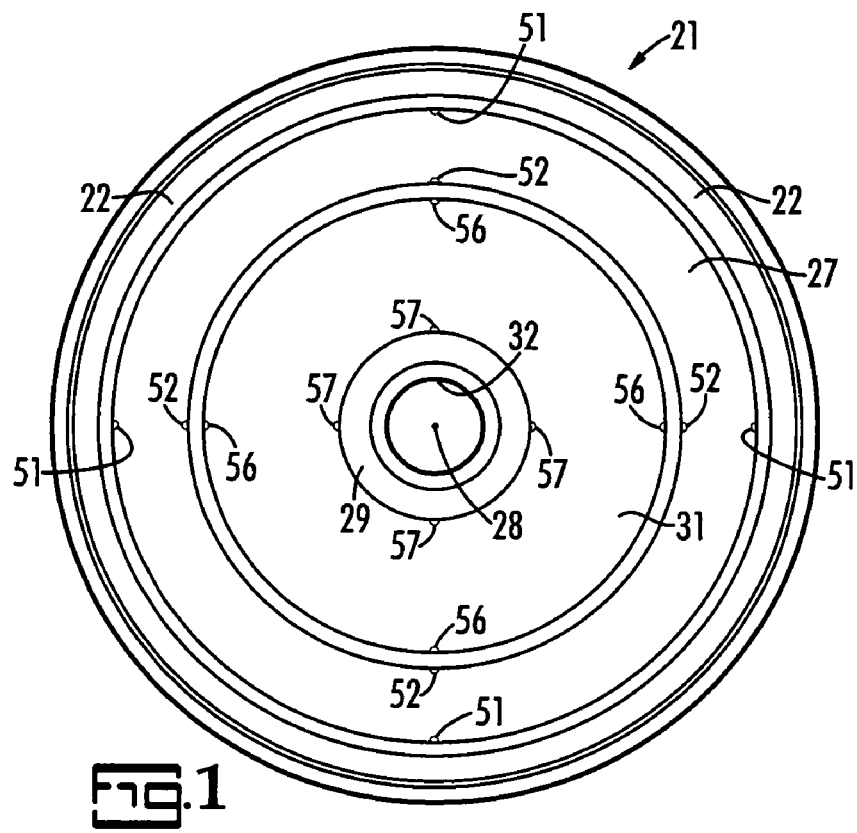
FIG. 1 is a front view of a first medallion base plate.

As shown in FIGS. 1 and 9, a medallion base plate 21 is provided which has a contoured outer annular ridge 22 at its radially outer edge. A shoulder 23 in the ridge 22 provides a decorative effect. The base plate 21 includes a somewhat smaller diameter annular ridge 26 and a flat bottom annular recess 27 between the ridges 22, 26. The base plate 21 also includes an annular ridge 29 near its center 28, which is somewhat higher than the intermediate ridge 26, and a smaller diameter flat bottom recess 31 between the ridges 26, 29. An opening 32 is provided in the center of the plate 22.

Figure 2:
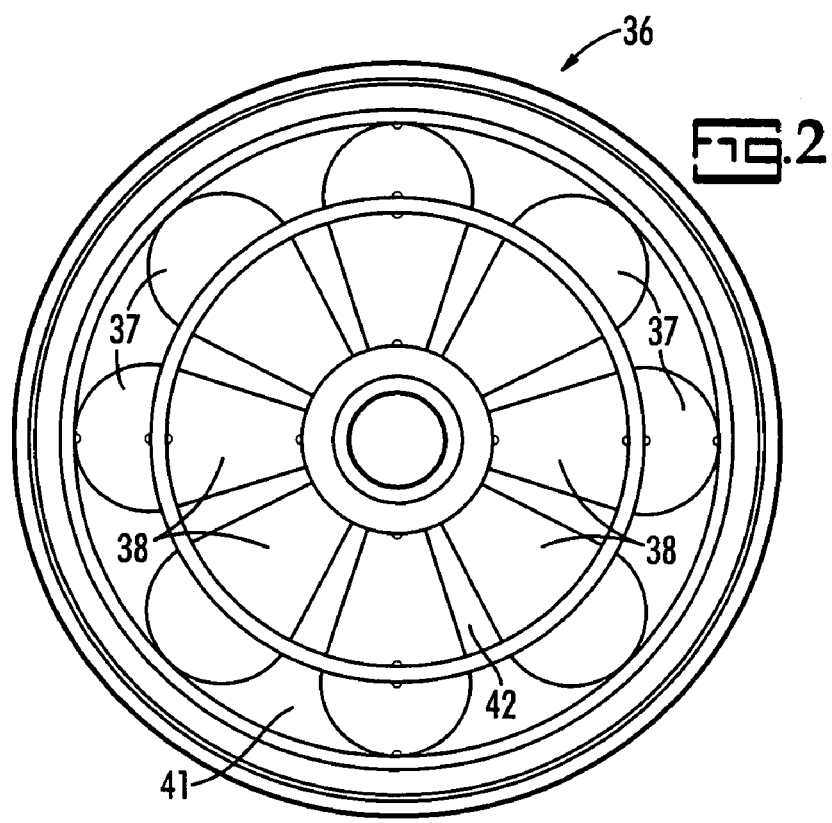
FIG. 2 is a front view of a second medallion base plate.
Figure 12:
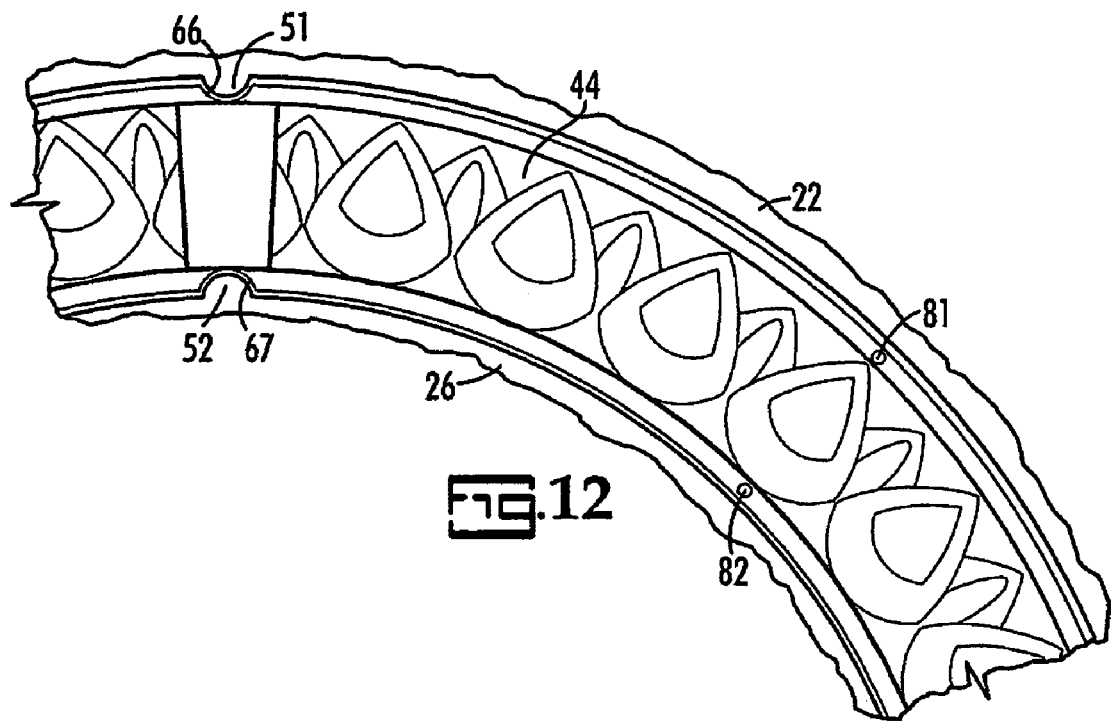
FIG. 12 is a partial front view a base plate and a ring showing notches, tabs and knobs which facilitate insertion and retention of the ring in the base plate
Figure 13:
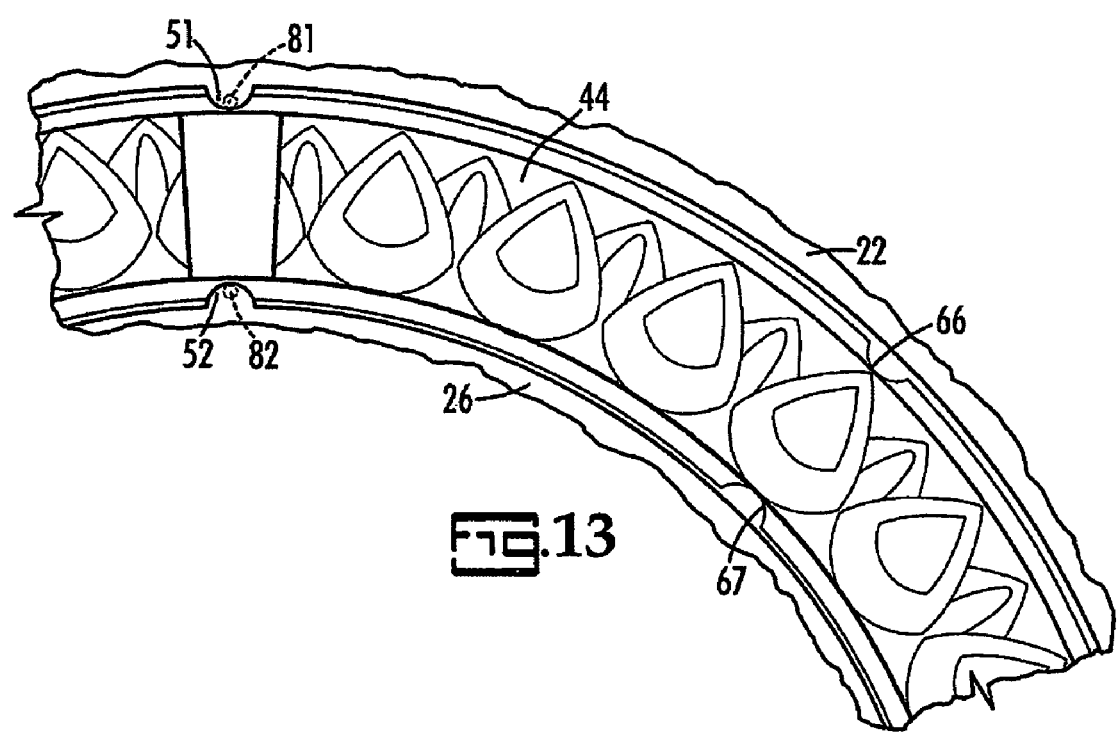
FIG. 13 shows the ring of FIG. 12 rotated counter clockwise 45 degrees bringing the knobs into a snap lock connection with the tabs.

A base plate 36 shown in FIG. 2 is similar to the base plate of FIG. 1 except radially extending openings 37, 38 have been formed in the bottoms of the recesses 41, 42, respectively, to produce a floral design. This configuration also saves material and produces a more ornamental appearance when the base plate 36 is used singularly as a medallion. FIG. 3 shows a relatively large diameter annular decorative ring 44 which is insertable into the recess 27 of the base plate 21 or into the recess 41 of the base plate 36. FIG. 4 shows a smaller diameter annular decorative ring 46 which is insertable into the recess 31 of the base plate 21 or into the recess 42 of the base plate 36. FIG. 5 shows an ornamental ring 47 having a different central configuration which is insertable into the recess 31 of the base plate 21 or into the recess 42 of the base plate 36. The ring 47 has a central annular opening 48 with a diameter slightly larger than the diameter of the central opening 32 in the base plate 21. The rings 44, 46, 47, and the plates 21, 36, can be used separately as individual medallions and in various combinations. Thus a set of mix and match ceiling medallions is provided which may be advantageously marketed individually or as a package.

FIG. 6 shows a medallion in which the large diameter decorative ring 44 is installed in the recess 27 of base plate 21 and there is no ring installed in the recess 31. FIG. 7 shows a medallion in which the smaller diameter ring 46 is installed in the annular recess 31 and the recess 27 is empty. FIG. 8 shows a medallion in which the recess 27 is filled with the ring 44 and the recess 31 is fitted with the ring 47. Using either ring 46 or ring 47 in the base plate 21 produces substantially the same decorative effect; however, when the rings 46, 47 are used individually as medallions there is a distinct difference in their appearance.

Referring also to FIGS. 9, 10, 11 and 12, the radially inner shoulder of the outer annular ridge 22 has four radially inward projecting, and equally circumferentially spaced, detent elements in the form tabs 52 which are spaced axially from the flat bottom of the recess 27 and the radially outer shoulder of the intermediate ridge 26 has four radially outward projecting tabs or detent elements 52 spaced axially from the flat bottom of the recess 27. The tabs 51 are aligned radially, respectively, with the tabs 52. In similar manner, the tabs 56, 57 are formed on the shoulders of the ridges 26, 29, respectively, so as to project into the recess 31 in axially spaced relation to its flat bottom. Each of the tabs 51, 52, 56, 57 has a curved pocket or socket 61 on it's under side facing the associated recess. One such socket 61 is shown in FIG. 10.

Referring to FIG. 3, the decorative ring 44 has four radially outwardly open notches 66 at 90 degree intervals in its circumference and has four radially inwardly open notches 67 in its radially inner edge which are in radial alignment; respectively, with the notches 66. Notches 71, 72 are formed in a similar manner in the decorative ring 46 as shown in FIG. 4. The decorative ring 47 shown in FIG. 5 has four equally spaced radially inward extending notches 76 in its outer periphery and no notches in its inner diameter or central opening 32. The notches 66, 67 on the ring 44 are sufficiently large to allow passage there through of tabs 51, 52, respectively, when the large ring 44 is installed in the recess 27 and the notches 71, 72 are sufficiently large to allow passage there through of the tabs 56, 57, respectively, when the small ring 46 is installed in the recess 31 of the base plate 21. The notches 76 on the outer periphery or perimeter of the ring 47 are sufficiently large to permit passage of the tabs 56 when the ring 47 is installed in the recess 31 of the base plate 21. There are no notches on the inner diameter of the ring 47.

Four detent elements in the form of four rounded or spherically shaped axially projecting knobs 81 are formed at equally spaced internals on the ring 44 near its radially outer edge and four detent elements or spherically shaped axially projecting knobs 82 are formed at 90 degree internals on the ring 44 near its radially inner edge. The knobs 81 are aligned radially with the knobs 82, respectively. In a similar manner knobs 83, 84 are formed on the ring 46. Knobs 86 are formed on the ring 47 at 90 degree intervals near its radially outer edge.

The ring 44 can be installed in the recess 27 of the base plate 21 by aligning the notches 66, 67 with the tabs 51, 52, respectively, and passing the tabs 51, 52 through the notches 66, 67, respectively. The ring 44 is then rotated relative to the base plate 21, as shown in FIG. 6, by an angle 91 of 45 degrees about the axis 28 to bring the knobs 81, 82 into a snap lock registration or detented relationship, respectively with the tabs 51, 52. As shown in FIG. 10 the knob 81 is releasably retained or detented in the socket 61 of the tab 51 in a snap lock engagement. The engaging surfaces of the tabs 51 and the knobs could be cylindrical in shape to provide a similar snap lock action when moved into and out of engagement. The tabs are made of a resilient material and flex during engagement with and disengagement from the knobs. The knobs on the ring could be circumferentially offset from the notches on such ring by an angle other than 45 degrees.

The herein described mix and match ceiling medallions are advantageous for a number of reasons. Each medallion based plate and ring can be used independently or various base plate and ring combinations can be used to produce a multitude of decorative medallions. In merchandising, the floor space is minimized and the customer is provided more choices of final design. The medallion base plates and rings can be marketed in a single package. The base plates and rings can also be packaged and sold individually.

What is claimed is:

1. A medallion comprising
   a thin annular plate having
      a central annular opening,
      a first annular ridge adjacent the radially outer edge of said plate,
      a second annular ridge adjacent said annular opening,
      a third annular ridge intermediate said first and second annular ridges, said first and third ridges defining a first annular recess, said second and third ridges defining a second annular recess, said opening, ridges and recesses being concentric and said recesses having substantially flat bottoms, and
      at least two tabs rigidly secured at equally spaced intervals to the radially inner side of said first annular ridge and extending radially inwardly in spaced relation to said bottom of said first annular recess and,
   a first decorative ring insertable in said first recess including
      at least two notches at equally spaced intervals on the radially outer edge of said first ring, said notches being sufficiently large to allow passage of said tabs there through when said first ring is inserted into said first recess and
      at least two detent knobs at equally spaced intervals on the radially outer edge of said first ring engageable with said tabs to releasable hold said first ring in said first recess when said first ring is inserted into said first recess and rotated to bring said detent knobs into detent relation with said tabs, respectively.

2. The medallion of claim 1 wherein said tabs and said knobs have mating configurations.

3. The medallion of claim 2 wherein said mating configurations are curved surfaces.

4. The medallion of claim 1 including at least two tabs rigidly secured at equally spaces intervals to the radially inner side of said third annular ridge and extending radially inwardly therefrom in spaced relation to said bottom of said second annular recess, a second decorative ring insertable in said second recess including notches at equally spaced intervals on the radially outer edge of said second ring and sufficiently large to allow passage of said at least two tabs there through when said second ring is inserted into said second recess, and detent knobs at equally spaced intervals on said second ring engageable with said at least two tabs on said radially inner side of said third annular ridge to releasably hold said second ring in said second recess when inserted therein and rotated to bring said detent knobs on said second ring into detent relation with said at least two tabs secured to said radially inner side of said third annular ridge.

5. A medallion comprising:
   a thin annular plate having
      a central annular opening,
      a first annular ridge concentric with said annular opening and
   a decorative ring having a radially inner annular edge and a radially outer annular edge, said annular ridge and one of said inner and outer edges of said ring having releasable detent components, respectfully, engageable to releasably connect said ring concentrically to said plate.

6. The medallion of claim 5 wherein said detent components are engaged by rotation of said ring relative to said plate.

7. The medallion of claim 5 including a second decorative ring having an annular edge and wherein said annular edge of said second ring and said annular ridge having releasable detent components, respectively, engageable to releasably connect said second ring concentrically to said plate in radially spaced relation to said first ring.

8. A medallion comprising:
   an annular base plate having at least one concentric annular recess,
   a first annular decorative ring adapted to fit in said annular recess and
   releasable mating detent components on said base plate and said first annular ring engageable to maintain said first annular ring in said one recess.

9. The medallion of claim 8 including a second annular recess in said base plate concentric to and spaced radially from said at least one annular recess, a second annular decorative ring adapted to fit in said second annular recess and
   releasable mating detent components on said base plate and said second decorative ring engageable to maintain said second annular ring in said second recess.

10. The medallion of claim 8 wherein said detent components are snap lock components.

11. The medallion of claim 10 wherein said detent components have complementary mating surfaces.

12. The medallion of claim 11 wherein said camming surfaces are semi-spherical.

13. The medallion of claim 8 wherein said plate includes a central annular opening.

14. The medallion of claim 13 wherein said plate includes circumferentially spaced radially extending openings depicting pedals of a flower.

* * * * *